(12) United States Patent
Bean et al.

(10) Patent No.: US 10,309,543 B2
(45) Date of Patent: Jun. 4, 2019

(54) EDGELESS VALVE SPOOL DESIGN WITH VARIABLE CLEARANCE

(71) Applicant: Caterpillar Inc., Peoria, IL (US)

(72) Inventors: Sunil J. Bean, Woodridge, IL (US); Shivangini Singh Hazari, Peoria, IL (US)

(73) Assignee: Caterpillar Inc., Deerfield, IL (US)

(*) Notice: Subject to any disclaimer, the term of this patent is extended or adjusted under 35 U.S.C. 154(b) by 231 days.

(21) Appl. No.: 15/264,210

(22) Filed: Sep. 13, 2016

(65) Prior Publication Data

US 2018/0073644 A1    Mar. 15, 2018

(51) Int. Cl.
   *F16K 31/42* (2006.01)
   *F16K 11/07* (2006.01)
   *B23P 15/00* (2006.01)
   *F15B 1/00* (2006.01)

(52) U.S. Cl.
   CPC ........ *F16K 11/0716* (2013.01); *B23P 15/001* (2013.01); *F15B 1/00* (2013.01); *F16K 11/0712* (2013.01); *F16K 31/426* (2013.01)

(58) Field of Classification Search
   CPC ............. F16K 11/0716; F16K 11/0712; F16K 31/426; B23P 15/001; F15B 1/00
   USPC .................................................. 137/625.69
   See application file for complete search history.

(56) References Cited

U.S. PATENT DOCUMENTS

| | | | |
|---|---|---|---|
| 3,176,721 A * | 4/1965 | Gordon | B62D 5/087 137/625.68 |
| 3,206,837 A | 9/1965 | Holmes | |
| 4,566,490 A | 1/1986 | Neff | |
| 4,576,265 A * | 3/1986 | Kumura | B60W 10/02 192/103 R |
| 4,756,330 A * | 7/1988 | Tischer | F15B 13/022 137/101 |
| 4,799,645 A * | 1/1989 | Kramer | F16K 31/406 251/30.04 |
| 4,827,981 A * | 5/1989 | Livecchi | F15B 13/0402 137/625.64 |
| 6,283,441 B1 | 9/2001 | Tian | |
| 7,063,100 B2 * | 6/2006 | Liberfarb | G05D 7/0133 137/101 |
| 7,779,853 B2 * | 8/2010 | Reilly | F15B 13/0402 137/14 |
| 2005/0133098 A1 * | 6/2005 | Ino | F15B 13/0402 137/625.65 |

FOREIGN PATENT DOCUMENTS

CN        203082269 U    7/2013

* cited by examiner

*Primary Examiner* — Craig J Price
(74) *Attorney, Agent, or Firm* — Miller, Matthias & Hull (57) ABSTRACT

A valve spool may include a cylindrical spool body having a spool longitudinal axis, a first spool body end wall and a second spool body end wall disposed axially opposite the first spool body end wall, and a spool outer surface. The spool outer surface may include a first spool guide region proximate the first spool body end wall and having a spool guide region outer diameter, a second spool guide region proximate the second spool body end wall and having the spool guide region outer diameter, and a spool tight clearance region disposed between the first spool guide region and the second spool guide region. The spool tight clearance region may have a spool tight clearance region outer diameter that is greater than the spool guide region outer diameter.

11 Claims, 5 Drawing Sheets

EDGELESS VALVE SPOOL DESIGN WITH VARIABLE CLEARANCE

TECHNICAL FIELD

The present disclosure relates generally to flow control valves and, more particularly, to a spool valve assembly having a valve spool with variable clearance between a spool outer surface and valve bore within which the valve spool is installed.

BACKGROUND

In many hydraulically actuated systems, such as hydraulically actuated fuel injectors, cryogenic pumps and the like, two-position, three-way spool valve assemblies control the operation of hydraulic components of the system. In general, the spool valve assembly opens an internal work fluid passage to a high pressure supply passage when the hydraulic fluid is supplied to the hydraulic component, such as to hydraulically move a piston. Between operation events, the internal work fluid passage is opened to a low pressure fluid passage or drain so that the used pressurized fluid in the internal work fluid passage can be removed, and the hydraulic component reset for its next operation event. In some cases, the operation of the spool valve assembly is controlled by a pilot valve member that is moved by a solenoid actuator to alternately provide and cut off pilot fluid that causes a valve spool to move between positions to control the flow of hydraulic fluid to and from the internal work fluid passage.

One example of a spool valve assembly is disclosed in U.S. Pat. No. 6,283,441 issued on Sep. 4, 2001, to Tian and entitled, "Pilot Actuator and Spool Valve Assembly." The Tian patent disclosed a pilot actuated spool valve assembly that includes a valve body that defines a first passage, a second passage and a flow passage. A unitary pilot body is at least partially positioned in the valve body and has a first valve seat and a second valve seat. A pilot member is moveable in the pilot body between an up position in which the pilot member closes the first valve seat and a down position in which the pilot member closes the second valve seat. A spool valve member has a control hydraulic surface and is positioned in the valve body. It is moveable between a first position in which the first passage is open to the flow passage, and a second position in which the second passage is open to the flow passage. At least one of the valve body, the pilot body, the pilot member and the spool valve member define a control volume fluidly connected to the first passage when the pilot member is in one of its up position and its down position. The control hydraulic surface of the spool valve member is exposed to fluid pressure in the control volume. The disclosed valve assembly finds application in a hydraulically actuated fuel injector having a direct control needle valve.

SUMMARY OF THE DISCLOSURE

In one aspect of the present disclosure, a valve spool is disclosed. The valve spool may include a cylindrical spool body having a spool longitudinal axis, a first spool body end wall and a second spool body end wall disposed axially opposite the first spool body end wall, and a spool outer surface. The spool outer surface may include a first spool guide region proximate the first spool body end wall and having a spool guide region outer diameter, a second spool guide region proximate the second spool body end wall and having the spool guide region outer diameter, and a spool tight clearance region disposed between the first spool guide region and the second spool guide region. The spool tight clearance region may have a spool tight clearance region outer diameter that is greater than the spool guide region outer diameter.

In another aspect of the present disclosure, a method for fabricating a valve spool is disclosed. The method may include securing a valve spool stock in a chuck of a cutting machine, machining a spool outer surface of the valve spool stock along an entire longitudinal length of the valve spool to a spool tight clearance region outer diameter, and, without removing the valve spool stock from the chuck of the cutting machine, machining a first spool guide region proximate a first spool body end wall of the valve spool and a second spool guide region proximate a second spool body end wall of the valve spool to a spool guide region outer diameter that is less than the spool tight clearance region outer diameter. A spool tight clearance region having the spool tight clearance region outer diameter is disposed between the first spool guide region and the second spool guide region.

In a further aspect of the present disclosure, a spool valve assembly is disclosed. The spool valve assembly may include a valve body having a valve bore extending longitudinally within the valve body and having a valve bore inner diameter, a high pressure fluid supply passage intersecting the valve bore, a high pressure fluid outlet passage intersecting the valve bore and a low pressure fluid drain passage intersecting the valve bore. The spool valve assembly may further include a valve spool disposed within the valve bore and having a cylindrical spool body, a spool longitudinal axis, a spool outer surface, a first spool body end wall and a second spool body end wall disposed axially opposite the first spool body end wall. The spool outer surface comprises a first spool guide region proximate the first spool body end wall and having a spool guide region outer diameter that is less than the valve bore inner diameter, a second spool guide region proximate the second spool body end wall and having the spool guide region outer diameter, and a spool tight clearance region disposed between the first spool guide region and the second spool guide region and having a spool tight clearance region outer diameter that is less than the valve bore inner diameter and greater than the spool guide region outer diameter. The high pressure fluid outlet passage is in fluid communication with the low pressure fluid drain passage and the high pressure fluid supply passage is not in fluid communication with the high pressure fluid outlet passage when the valve spool is in a first valve spool position within the valve bore, and the high pressure fluid supply passage is in fluid communication with the high pressure fluid outlet passage and the high pressure fluid outlet passage is not in fluid communication with the low pressure fluid drain passage when the valve spool is in a second valve spool position within the valve bore.

Additional aspects are defined by the claims of this patent.

DETAILED DESCRIPTION

Figure 1:
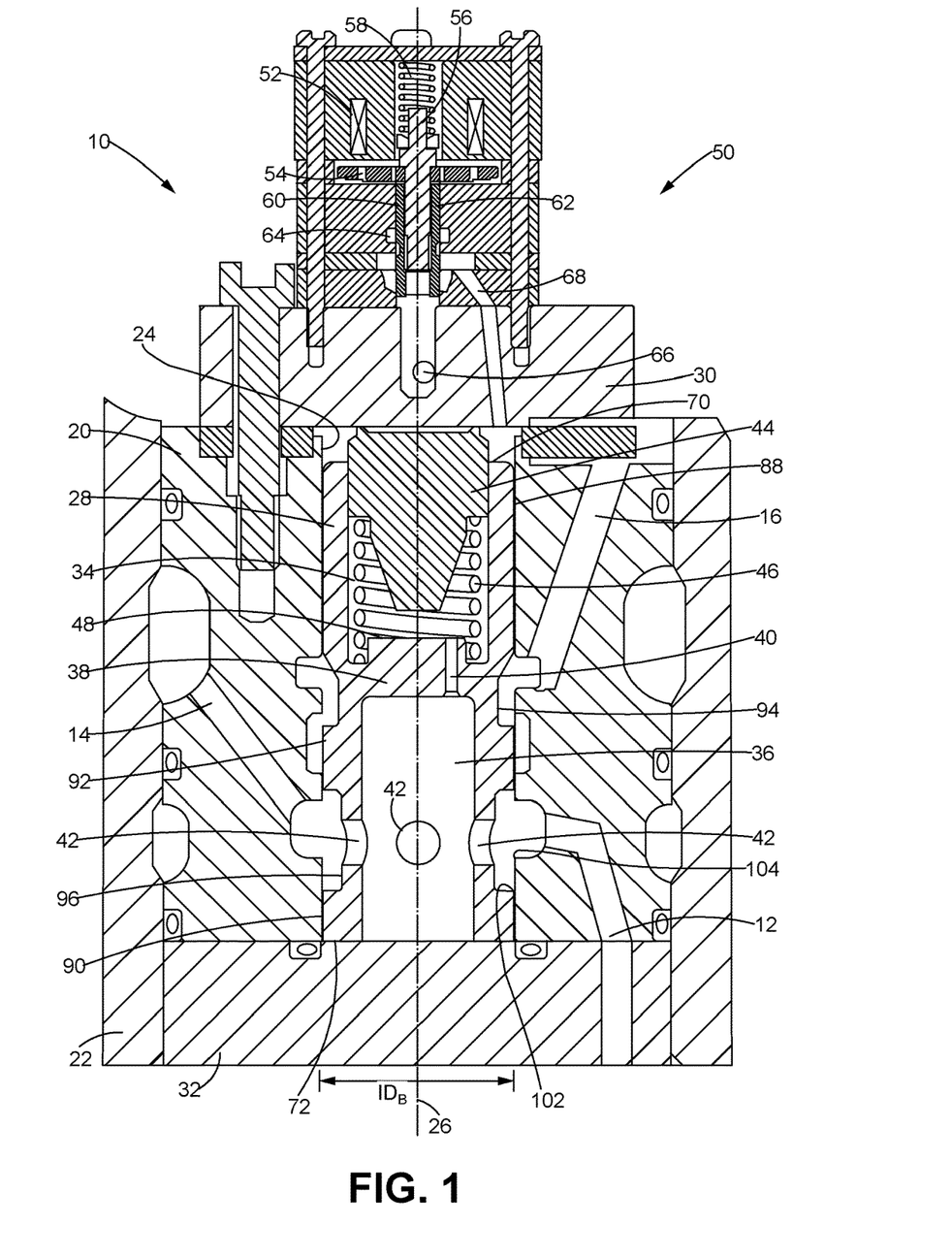
FIG. 1 is a side cross-sectional view of a spool valve assembly in accordance with the present disclosure in a first valve spool position or a valve closed position.
Figure 2:
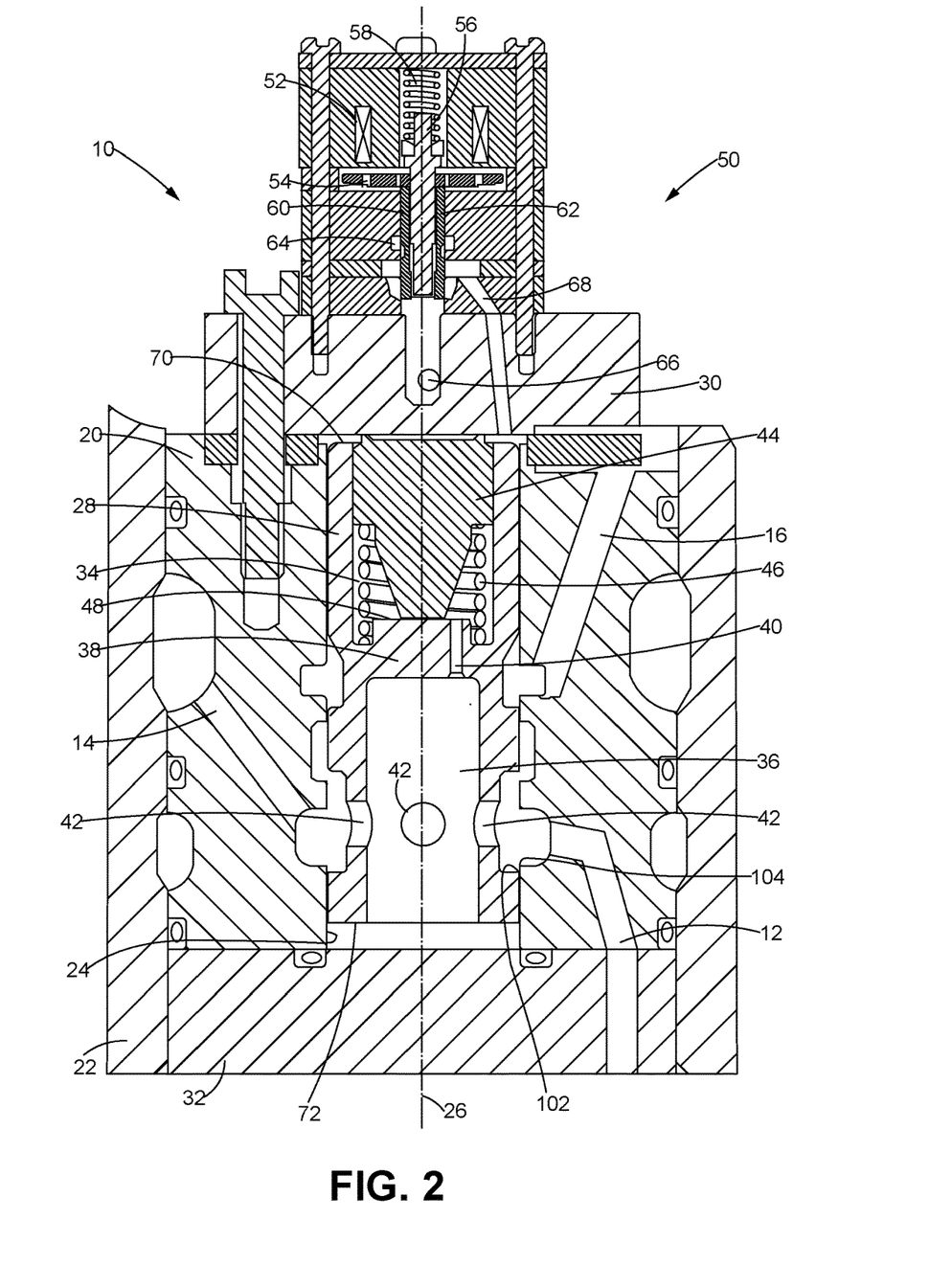
FIG. 2 is the side cross-sectional view of the spool valve assembly of FIG. 1 in a second valve spool position or a valve open position.

FIGS. 1 and 2 illustrate an exemplary embodiment of a spool valve assembly 10. The spool valve assembly 10 as illustrated is a two-position, three-way hydraulic valve that may alternately connect a high pressure fluid outlet passage 12 to a high pressure fluid supply passage 14 and a low pressure fluid drain passage 16. The high pressure fluid supply passage 14 may be connected to a high pressure fluid source (not shown) and the low pressure fluid drain passage 16 may be connected to a low pressure fluid reservoir (not shown) that may receive fluid from the spool valve assembly 10 and other hydraulic components and subsequently provide the low pressure fluid back to an inlet of the high pressure fluid source. The high pressure fluid outlet passage 12 may be fluidly connected to other hydraulic elements of a machine in which a hydraulic system is implemented to control the operation of the hydraulic elements. Those skilled in the art will understand that the principles discussed herein for the spool valve assembly 10 in accordance with the present disclosure may be equally applicable to other spool valve assemblies having two or more valve positions and operating to control the fluid connections and transfer of hydraulic fluid between any number of fluid passages for which fluid flow control is desired. The implementation of the operating principles and fabrication of the spool valve assembly 10 of the present disclosure in such spool valve assemblies is contemplated by the inventors.

Referring to FIG. 1, the illustrated spool valve assembly 10 includes a valve body 20 disposed within a valve housing 22. The high pressure fluid outlet passage 12, the high pressure fluid supply passage 14 and the low pressure fluid drain passage 16 may extend through the valve body 20 and intersect a valve bore 24 extending longitudinally though the valve body 20 and having a bore longitudinal axis 26. The valve bore 24 may have a valve bore inner diameter $ID_B$ that is dimensioned so that a valve spool 28 can be disposed therein and slidable within the valve bore 24 to control the fluid connections between the fluid passages 12, 14, 16. The dimensional relationships between the valve bore 24 and the valve spool 28 are discussed further hereinafter.

Opposite ends of the valve bore 24 may be closed off by a valve upper end wall 30 and a valve lower end wall 32 to retain the valve spool 28 therein. The valve spool 28 as illustrated includes a first balance chamber 34 and a second balance chamber 36 separated by a valve spool intermediate wall 38. A spool balance fluid passage 40 may extend through the valve spool intermediate wall 38 to fluidly connect the first balance chamber 34 to the second balance chamber 36. High pressure fluid from the high pressure fluid supply passage 14 may enter the second balance chamber 36 through one or more radial passages 42 and pass into the first balance chamber 34 through the spool balance fluid passage 40 to partially or fully balance the hydraulic pressure forces acting in both longitudinal directions on the valve spool 28. In the illustrated embodiment, a valve spool stop member 44 is partially disposed within the first balance chamber 34 and engaged by the valve upper end wall 30 to limit the upward movement of the valve spool 28. A valve spool spring 46 is disposed between the valve spool stop member 44 and the valve spool intermediate wall 38 to bias the valve spool 28 downward away from the valve spool stop member 44 and toward a first valve spool position or valve closed position of FIG. 1. A valve spool stop surface 48 of the valve spool intermediate wall 38 engages the valve spool stop member 44 at a second valve spool position or a valve open position of the valve spool 28 as shown in FIG. 2.

Returning to FIG. 1, movement of the valve spool 28 within the valve bore 24 may be controlled by an electrical actuator such as a solenoid actuator 50 attached at an upper end of the valve body 20 and the valve upper end wall 30. The solenoid actuator 50 illustrated and described herein is exemplary, and any other known electrical actuator known in the art, such as piezoelectric actuators and the like, may be implemented in the spool valve assembly 10 to control the movement of the valve spool 28. The solenoid actuator 50 as illustrated includes a stationary coil 52 and a moveable armature 54. The armature 54 is attached to a pilot member 56, and both components are biased downward toward the valve body 20 by an armature spring 58. The solenoid actuator 50 further includes a pilot valve spool 60 disposed on the pilot member 56 below the armature 54 and slidable within an actuator bore 62. The actuator bore 62 is intersected by a second high pressure fluid supply passage 64 fluidly connected to the high pressure fluid source, a pilot drain passage 66 fluidly connected to the low pressure fluid reservoir, and a high pressure pilot fluid passage 68 that extends through the valve upper end wall 30 to the valve bore 24 to place the actuator bore 62 in fluid communication with the valve bore 24.

As shown in FIG. 1, the solenoid actuator 50 is not energized and the armature spring 58 biases the armature 54, the pilot member 56 and the pilot valve spool 60 downward toward the valve body 20. In this position, the pilot valve spool 60 places the second high pressure fluid supply passage 64 in fluid communication with the high pressure pilot fluid passage 68 and high pressure pilot fluid is communicated to the valve bore 24. The high pressure pilot fluid from the high pressure pilot fluid passage 68 is exposed to a first spool body end wall 70 of the valve spool 28 that functions as a hydraulic surface upon which the high pressure pilot fluid exerts a downward hydraulic force on the valve spool 28. The downward hydraulic force moves the valve spool 28 downward so that a second spool body end wall 72 engages the valve lower end wall 32 at the valve closed position.

When the stationary coil 52 of the solenoid actuator 50 is energized, the armature 54, the pilot member 56 and the pilot valve spool 60 are lifted upward by magnetic force. The solenoid actuator 50 moves to a position as shown in FIG. 2 in which the pilot valve spool 60 separates the second high pressure fluid supply passage 64 from the high pressure pilot fluid passage 68, and fluidly connects the high pressure pilot fluid passage 68 to the pilot drain passage 66. As the high pressure pilot fluid drains from the high pressure pilot fluid passage 68, the pressure from the fluid in the high pressure fluid supply passage 14 forces the valve spool 28 upward until the valve spool stop surface 48 engages the valve spool stop member 44 at the valve open position of the valve spool 28. As the valve spool 28 moves to the valve open position, the low pressure fluid drain passage 16 is cut off from the high pressure fluid outlet passage 12, and the high pressure fluid supply passage 14 is placed in fluid communication with the high pressure fluid outlet passage 12 to transmit fluid to the hydraulic elements that are controlled by the spool valve assembly 10. De-energizing the stationary coil 52 of the solenoid actuator 50 allows the armature spring 58 to force the armature 54, the pilot member 56 and the pilot valve spool 60 downward so that high pressure pilot fluid is again provided to the valve bore 24 to force the valve spool 28 back to the valve closed position of FIG. 1.

Figure 3:
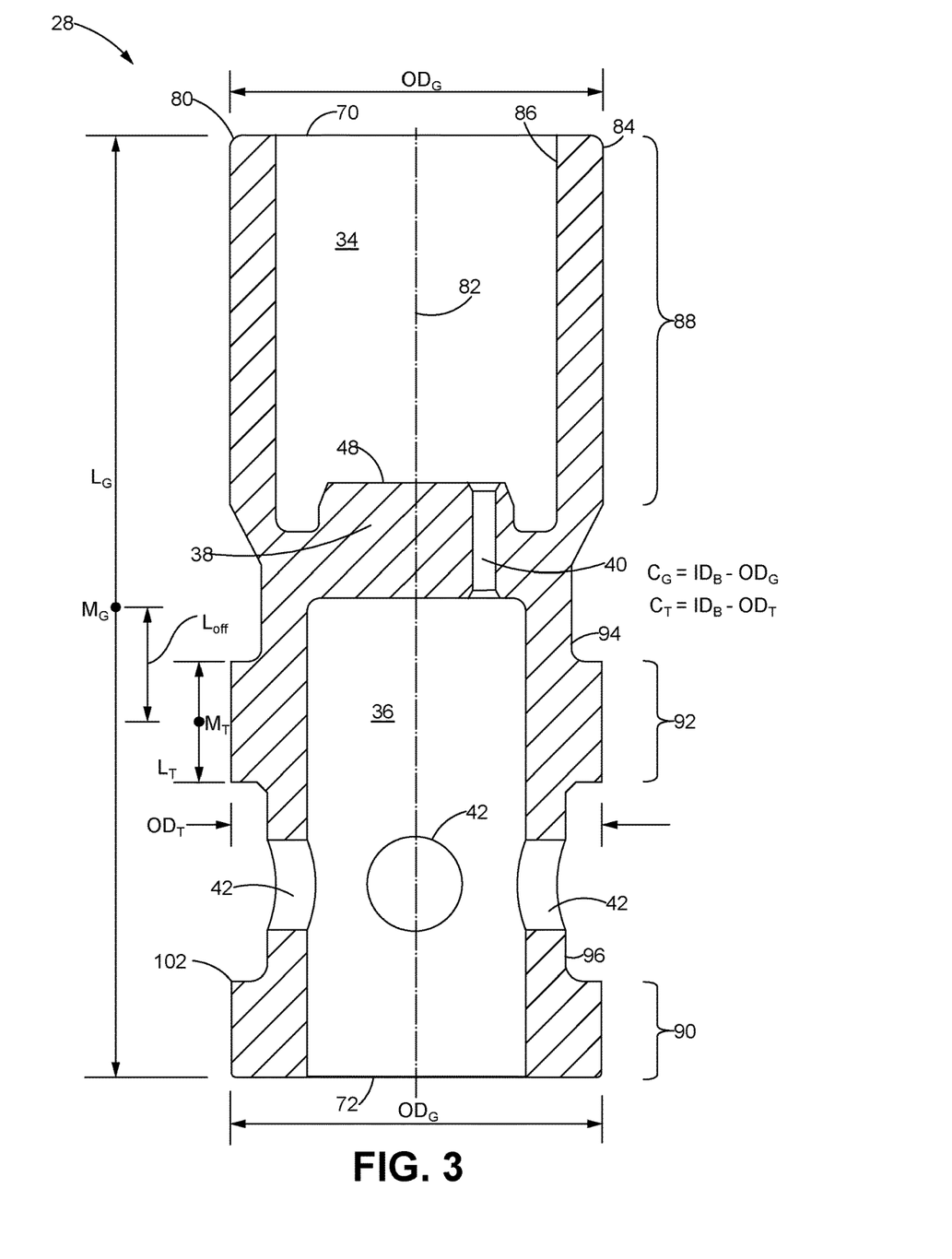
FIG. 3 is a side cross-sectional view of a valve spool of the spool valve assembly of FIG. 1.

The cross-sectional view of FIG. 3 illustrates the valve spool 28 in greater detail. The valve spool 28 has a generally cylindrical spool body 80 that is symmetrical about a spool longitudinal axis 82. The spool longitudinal axis 82 is substantially parallel to and coincident with the bore longitudinal axis 26 when the valve spool 28 is disposed within the valve bore 24. Exceptions to the aligned orientation of the longitudinal axes 26, 82 are discussed further below. The cylindrical spool body 80 of the valve spool 28 includes a spool outer surface 84 extending between the first spool body end wall 70 and the second spool body end wall 72. The spool body further includes a spool inner surface 86 defining the first balance chamber 34 extending inwardly from the first spool body end wall 70, the second balance chamber 36 extending inwardly from the second spool body end wall 72, and the spool balance fluid passage 40 extending through the valve spool intermediate wall 38.

The spool outer surface 84 defines the external features of the valve spool 28 that interact with the valve bore 24 and the fluid passages 12, 14, 16. The spool outer surface 84 includes a first spool guide region 88 extending proximate the first spool body end wall 70 and a second spool guide region 90 extending proximate the second spool body end wall 72. In the illustrated embodiment, the spool guide regions 88, 90 have a spool guide region outer diameter $OD_G$ that is less than the valve bore inner diameter $ID_B$ of the valve bore 24 so that the valve spool 28 is slidable within the valve bore 24. The spool outer surface 84 further defines a spool tight clearance region 92 that is disposed between the spool guide regions 88, 90 and positioned to control the fluid connections between the fluid passages 12, 14, 16 as the valve spool 28 moves between the valve closed position and the valve open position as shown in FIGS. 1 and 2, respectively. The spool tight clearance region 92 has a spool tight clearance region outer diameter $OD_T$ that is less than the valve bore inner diameter $ID_B$ so that the valve spool 28 is slidable within the valve bore 24. Additionally, the spool tight clearance region outer diameter $OD_T$ is greater than the spool guide region outer diameter $OD_G$ as will be discussed further below.

To further facilitate the fluid connections and fluid flow provided by the spool valve assembly 10, the spool outer surface 84 defines a first spool intermediate region 94 in the shape of an annulus between the first spool guide region 88 and the spool tight clearance region 92. The first spool intermediate region 94 has a varying first spool intermediate region outer diameter that is less than the spool guide region outer diameter $OD_G$ so that the first spool intermediate region 94 is recessed relative to the spool guide regions 88, 90 and the spool tight clearance region 92. When the valve spool 28 is in the valve closed position of FIG. 1, fluid from the high pressure fluid outlet passage 12 flows through the first spool intermediate region 94 and into the low pressure fluid drain passage 16.

Returning to FIG. 3, a second spool intermediate region 96 in the shape of an annulus is defined in the spool outer surface 84 between the second spool guide region 90 and the spool tight clearance region 92. The second spool intermediate region 96 has a varying second spool intermediate region outer diameter that is less than the spool guide region outer diameter $OD_G$ so that the second spool intermediate region 96 is recessed relative to the spool guide regions 88, 90 and the spool tight clearance region 92. When the valve spool 28 is in the valve open position of FIG. 2, fluid from the high pressure fluid supply passage 14 flows through the second spool intermediate region 96 and into the high pressure fluid outlet passage 12.

It is desirable to keep power demand of the hydraulic system in which the spool valve assembly 10 is implemented as low as possible while delivering an adequate flow and pressure of hydraulic fluid to the hydraulic elements. For the flow control components like the spool valve assembly 10 that actuates the hydraulic elements, it is desirable to have clearances between the valve spool 28 and the valve bore 24 that are large enough to ensure no mechanical binding will occur due to pressurization or thermal effects, but small enough to ensure low static leak of the high pressure fluid and minimization of hydraulic power loss due to such leakage. The valve spool assembly 10 in accordance with the present disclosure addresses these conflicting performance goals by providing the valve bore inner diameter $ID_B$ with an approximately constant value, and by having the spool guide region outer diameter $OD_G$ being less than the spool tight clearance region outer diameter $OD_T$ as described above. Fabricating the valve spool 28 with these dimensions of the spool outer surface 84 will give the spool guide regions 88, 90 looser clearance from the valve bore 24 near the spool body end walls 70, 72, respectively, while the spool tight clearance region 92 has a tighter clearance proximate the center of the valve spool 28 where fluid flow control occurs and minimizing leakage is critical for optimal hydraulic performance.

With these dimensional relationships between the valve bore 24 and the regions 88, 90, 92 of the valve spool 28, it can be challenging to the designer to find outer diameter dimensions and corresponding surface clearances to balance the tradeoffs between reducing or eliminating mechanical binding and minimizing static leak and hydraulic power losses. In the spool valve assembly 10 in accordance with the present disclosure, appropriate ranges of clearances of the spool tight clearance region 92 from the valve bore 24 may be derived using the clearances of the spool guide regions 88, 90 along with other relevant dimensions of the valve spool 28. Referring again to FIG. 3, the valve spool 28 will have a spool longitudinal guide length $L_G$ from the first spool body end wall 70 to the second spool body end wall 72, and a spool longitudinal guide midpoint $M_G$ between the spool body end walls 70, 72. The spool tight clearance region 92 will have a spool longitudinal tight clearance region length $L_T$ and a longitudinal tight clearance region midpoint $M_T$. An offset length $L_{OFF}$ for the valve spool 28 may be equal to a longitudinal distance between the spool longitudinal tight clearance region midpoint $M_T$ and the spool longitudinal guide midpoint $M_G$.

When the valve spool 28 is assembled in the valve bore 24, the spool guide regions 88, 90 will have a spool guide region diametrical clearance $C_G$ equal to the valve bore inner diameter $ID_B$ minus the spool guide region outer diameter $OD_G$. A spool tight clearance region diametrical clearance $C_T$ will be equal to the valve bore inner diameter $ID_B$ minus the spool tight clearance region outer diameter $OD_T$. Because the spool tight clearance region outer diameter $OD_T$ is greater than the spool guide region outer diameter $OD_G$, the spool guide region diametrical clearance $C_G$ will be greater than the spool tight clearance region diametrical clearance $C_T$. Where the spool guide region diametrical clearance $C_G$ may be dictated by known operating parameters such as anticipated thermal effects on the valve spool 28 that can cause thermal expansion and contraction, such as where the spool valve assembly 10 is implemented in a cryogenic pump, a maximum spool guide region diametrical clearance $C_{Gmax}$ may be established. With the maximum spool guide region diametrical clearance $C_{Gmax}$ defined, a minimum spool tight clearance region diametrical clearance $C_{Tmin}$ may be calculated by the following formula:

$$C_{Tmin} = C_{Gmax} * \left[\frac{L_T}{L_G} + \frac{2*L_{OFF}}{L_G}\right] \quad (1)$$

Figure 4:
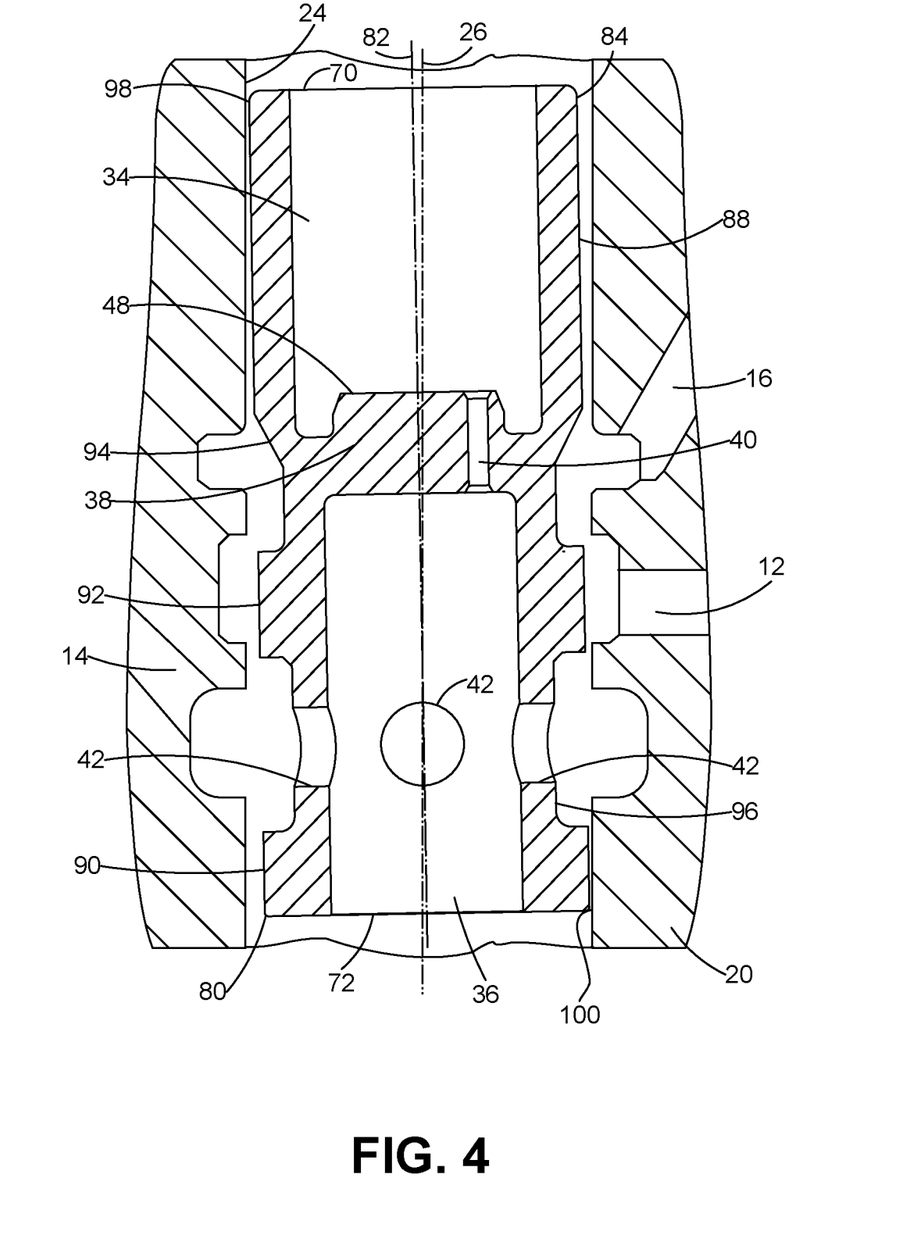
FIG. 4 is the side cross-sectional view of the valve spool view of FIG. 3 with the valve spool partially rotated within a valve bore of the spool valve assembly of FIG. 1 about an axis of rotation perpendicular to a spool longitudinal axis.

The minimum spool tight clearance region diametrical clearance $C_{Tmin}$ establishes a minimum clearance necessary between the valve bore 24 and the spool tight clearance region 92 to ensure that the spool outer surface 84 at the spool tight clearance region 92 does not engage the valve bore 24 when the spool guide region diametrical clearance $C_G$ allows the valve spool 28 to shift within the valve bore 24. As shown in FIG. 4, where the magnitude of the clearances $C_G$, $C_T$ are exaggerated for purposes of illustration, the clearances $C_G$, $C_T$ between the valve bore 24 and the spool outer surface 84 can allow the valve spool 28 to rotate about an axis perpendicular to the spool longitudinal axis 82 so that the spool longitudinal axis 82 is not parallel to and coincident with the bore longitudinal axis 26. A first spool edge 98 of the first spool guide region 88 proximate the first spool body end wall 70 and a second spool edge 100 of the second spool guide region 90 proximate the second spool body end wall 72 may contact corresponding portions of the valve bore 24. However, the spool tight clearance region diametrical clearance $C_T$ determined according to Equation (1) ensures that sufficient clearance exists between the valve bore 24 and the spool tight clearance region 92 so that the spool outer surface 84 at the spool tight clearance region 92 does not engage the valve bore 24 at the edges of the openings of the fluid passages 12, 14, 16, thereby preventing excessive wear of the surfaces.

Wear can further be reduced by configuring the valve bore 24 and the valve spool 28 to minimize the instances of edges of the valve spool 28 crossing edges of the valve bore 24 such as at the openings of the fluid passages 12, 14, 16. Eliminating crossing edges can reduce instances where pressurized fluid engages and flows over exposed edges and causes wear of the valve spool 28 and produces debris in the hydraulic fluid that can cause further wear on other components of the hydraulic system. As an example, the second spool guide region 90 may intersect the second spool intermediate region 96 at a spool guide region edge 102 (FIG. 3), and the high pressure fluid supply passage 14 may intersect the valve bore 24 at a fluid passage edge 104 (FIGS. 1 and 2). When the valve spool 28 in the closed position of FIG. 1, the high pressure fluid supply passage 14 is cutoff from the high pressure fluid outlet passage 12 and there is no fluid flow past the fluid passage edge 104 or past the spool guide region edge 102 that is disposed below the fluid passage edge 104. When the valve spool 28 is moved to the open position of FIG. 2 to fluidly connect the high pressure fluid supply passage 14 to the high pressure fluid outlet passage 12, fluid flow past the fluid passage edge 104 occurs, but the spool guide region edge 102 has not crossed the fluid passage edge 104 and is still disposed below the fluid passage edge 104. Consequently, the fluid flowing from the high pressure fluid supply passage 14 does not cause wear at the spool guide region edge 102.

Equation (1) factors in the relative sizes of the spool guide regions 88, 90 and the spool tight clearance region 92, and the longitudinal position of the spool tight clearance region 92 along the spool outer surface 84. The ratio $L_T/L_G$ will have a value that is less than 1 because the length of the valve spool 28 is greater than the length of the spool tight clearance region 92. The value of the ratio will decrease as the spool longitudinal tight clearance region length $L_T$ decreases so that a tighter spool tight clearance region diametrical clearance $C_T$ is possible where the spool tight clearance region 92 can be shortened while still controlling the fluid flow between the fluid passages 12, 14, 16. The spool tight clearance region diametrical clearance $C_T$ also has a proportional relationship with the offset length $L_{OFF}$. If the offset length $L_{OFF}$ is equal to zero, the offset factor drops out of Equation (1) and the spool tight clearance region diametrical clearance $C_T$ will be based solely on the ratio $L_T/L_G$. However, as the spool tight clearance region 92 is moved away from the spool longitudinal guide midpoint $M_G$ and toward one of the spool body end walls 70, 72, the offset length $L_{OFF}$ and the factor ($2*L_{OFF}/L_G$) will increase and correspondingly increase the minimum spool tight clearance region diametrical clearance $C_{Tmin}$ so that the spool tight clearance region 92 is not disposed as tightly within the valve bore 24.

Two boundary conditions assist in illustrating and validating Equation (1). First, as the spool longitudinal tight clearance region length $L_T$ increases, the value of the minimum spool tight clearance region diametrical clearance $C_{Tmin}$ approaches the maximum spool guide region diametrical clearance $C_{Gmax}$. In the extreme case where the spool longitudinal tight clearance region length $L_T$ is equal to the spool longitudinal guide length $L_G$, the ratio $L_T/L_G$ is equal to 1, and the offset length $L_{OFF}$ is equal to 0. In this condition, Equation (1) reduces to $C_{Tmin}=C_{Gmax}$. This result makes sense because the spool tight clearance region 92 cannot be offset from the spool guide regions 88, 90 if the spool tight clearance region 92 is the same length as the valve spool 28 so that there must be a uniform spool outer diameter, only one diametrical clearance and no separate spool tight clearance region 92.

A second boundary condition occurs at a maximum offset length $L_{OFF}$. This condition occurs where the spool tight clearance region 92 is positioned at one of the spool body end walls 70, 72, and the offset length LOFF is equal to $L_G/2-L_T/2$). Inserting the offset length LOFF into Equation (1):

$$C_{Tmin} = C_{Gmax} * \left[\frac{L_T}{L_G} + \frac{2*(L_G/2 - L_T/2)}{L_G}\right] \quad (2)$$

Simplifying:

$$C_{Tmin} = C_{Gmax} * \left[\frac{L_T}{L_G} + \frac{L_G}{L_G} - \frac{L_T}{L_G}\right] \quad (3)$$

As with the first boundary condition, Equation (3) reduces to $C_{Tmin}=C_{Gmax}$ and there must be a uniform spool outer diameter and only one diametrical clearance, and no separate spool tight clearance region 92.

In one exemplary implementation of the spool valve assembly 10, the valve bore 24 and the valve spool 28 may be designed so that the maximum spool guide region diametrical clearance $C_{Gmax}$ between the valve bore 24 and the spool guide regions 88, 90 is 22 µm, and the spool longitudinal guide length $L_G$ of the valve spool 28 is 62.02 mm (2.442 inches). The spool longitudinal tight clearance region length $L_T$ in the present example is 8.150 mm (0.3209 inch). If the spool tight clearance region 92 is aligned at approximately the longitudinal center of the valve spool 28, the offset length $L_{OFF}$ would be equal to 0 and Equation (1) would yield a minimum spool tight clearance region diametrical clearance $C_{Tmin}$ of approximately 2.98 µm (113.8 microinches) based on the ratio $L_T/L_G$. If the spool longitudinal tight clearance region length $L_T$ is maintained and the spool tight clearance region 92 is moved toward one of the spool body end walls 70, 72, the minimum spool tight clearance region diametrical clearance $C_{Tmin}$ will increase as the offset length $L_{OFF}$ factor of Equation (1) increases. For example, if the spool tight clearance region 92 is moved to an offset length $L_{OFF}$ of 13.465 mm (0.5301 inch), the minimum spool tight clearance region diametrical clearance $C_{Tmin}$ will increase to approximately 12.4 µm (488.2 microinches).

The benefits of the spool valve assembly 10 in accordance with the present disclosure at least in the area of static leakage and hydraulic power losses can be seen in the present example. In spool valves having a cylindrical valve bore and a cylindrical valve spool, static leakage at the interface between the valve bore 24 and the valve spool 28 is proportional to the cube of the diametrical clearance between the valve bore 24 and the valve spool 28. In previous spool valves with a spool outer surface of the valve spool having a constant outer diameter, the clearance at the regions 88, 90, 92 would be 22 µm (866.1 microinches). In the present example in accordance with the present disclosure, the minimum spool tight clearance region diametrical clearance $C_{Tmin}$ improves from 22 µm (866.1 microinches) to approximately 12.4 µm (488.2 microinches). Even where factors such as deflection and thermal affects in the area of the spool tight clearance region 92 are taken into account, the spool tight clearance region diametrical clearance $C_T$ may be approximately 14 µm (551.2 microinches). The static leakage improvement may be shown by the following equation:

$$\frac{Leak_{after}}{Leak_{before}} \propto \frac{14^3}{22^3} \propto 0.4050 \qquad (4)$$

This example represents an approximately 60% improvement in static leakage performance. If the static leakage was 10 L/min in prior spool valves with a clearance of 22 µm (866.1 microinches), the static leakage in the spool valve assembly 10 in accordance with the present disclosure with a clearance of 14 µm (551.2 microinches) would be reduced to 4 L/min. If the total hydraulic power consumption in the previous spool valve was 100 L/min with a static leakage of 10 L/min and 90 L/min of useful consumption, the total hydraulic power consumption can be reduced to 94 L/min with a static leakage of 4 L/min to yield the same useful power consumption of 90 L/min, and thereby realizing an approximately 6% improvement in efficiency with the valve spool assembly 10 in accordance with the present disclosure.

INDUSTRIAL APPLICABILITY

Those skilled in the art will understand that the various parameters of Equation (1) can be manipulated to achieve a desired combination of minimized mechanical binding in the regions 88, 90, 92 and minimal static leakage and hydraulic power loss at the interface between the valve bore 24 and the spool tight clearance region 92. The maximum spool guide region diametrical clearance $C_{Gmax}$ and the lengths $L_G$, $L_T$, $L_{OFF}$ can be varied during the valve design process to achieve a desired minimum spool tight clearance region diametrical clearance $C_{Tmin}$. Of course, it may be necessary to make corresponding adjustments to the valve bore 24 and the sizes and positions of the openings for the fluid passages 12, 14, 16 to achieve the desired control of fluid flow through the spool valve assembly 10. Additionally, a required spool tight clearance region diametrical clearance $C_T$ may be dictated for a particular implementation. In such situations, the specified spool tight clearance region diametrical clearance $C_T$ may be used in Equation (1) along with the lengths $L_G$, $L_T$, $L_{OFF}$ to solve for a corresponding spool guide region diametrical clearance $C_G$ to balance the tradeoffs between reducing or eliminating mechanical binding and minimizing static leak and hydraulic power losses.

Figure 5:
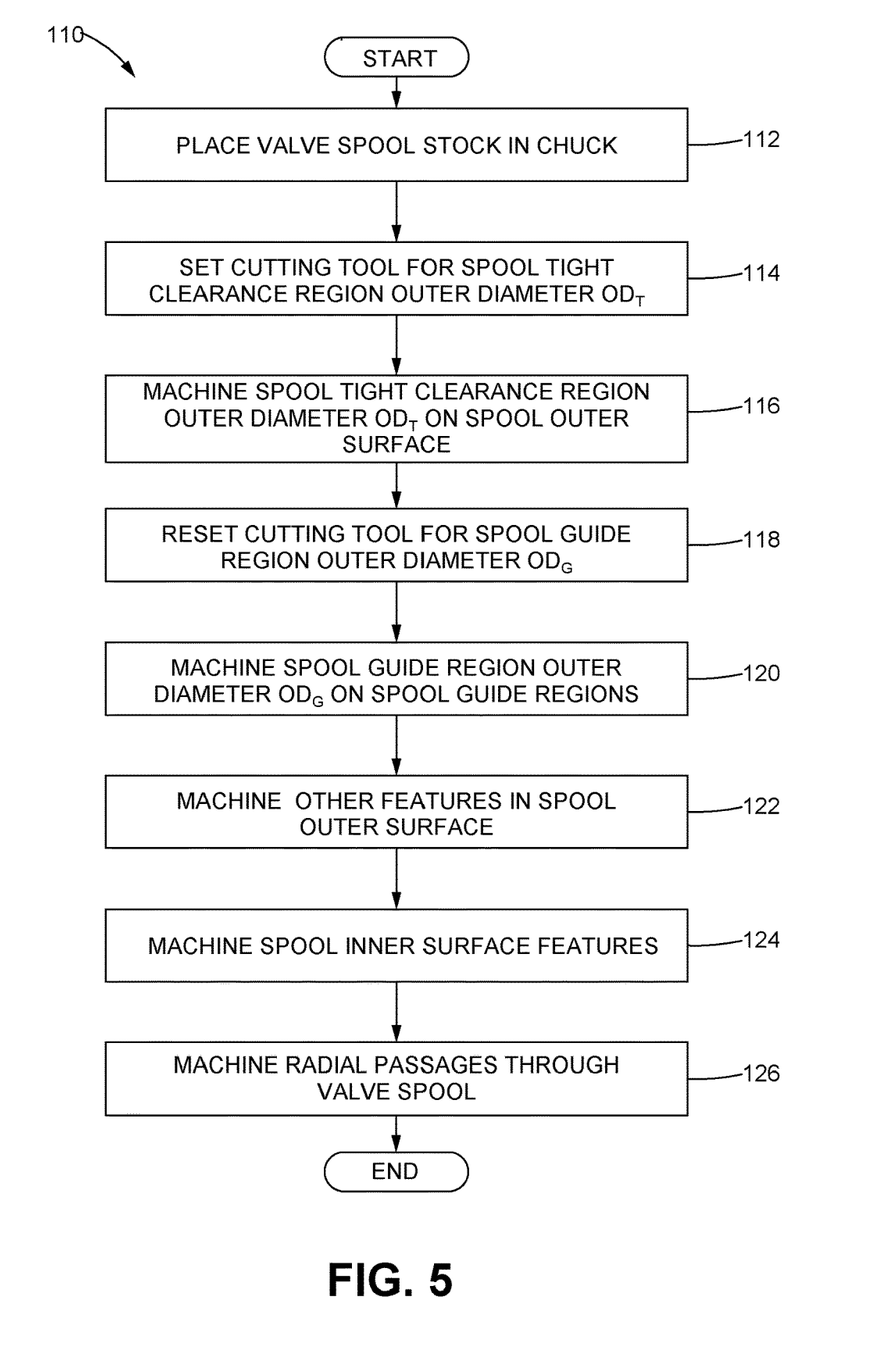
FIG. 5 is a flow diagram of a valve spool fabrication routine for the valve spool of FIG. 3.

The valve spool 28 in accordance with the present disclosure may allow for efficient fabrication where the regions 88, 90, 92 may be formed to provide two different diametrical clearances $C_G$, $C_T$ as illustrated and described herein. FIG. 5 illustrates a valve spool fabrication routine 110 for machining the valve spool 28 out of a piece of valve spool stock. The valve spool stock may be a piece of any appropriate metal or alloy such steel, aluminum or the like that can function to control the flow of fluid through the spool valve assembly 10 under the anticipated operating conditions. The routine 110 may begin at a block 112 where the valve spool stock from which the valve spool 28 will be inserted into and secured in a chuck of a machine that will machine the spool outer surface 84. With the valve spool stock in place in the chuck, control may pass to a block 114 where a position of a cutting tool is set to machine the spool outer surface 84 to the spool tight clearance outer diameter $OD_T$ that will be the maximum outer diameter of the valve spool 28. Of course, the cutting tool may be set to the appropriate position prior to securing the valve spool stock in the chuck.

With the valve spool stock secured in the chuck and the cutting tool in position, control may pass to a block 116 where the machine is operated to machine the entire spool outer surface 84 to the spool tight clearance outer diameter $OD_T$. After the spool outer surface 84 is machined to the spool tight clearance outer diameter $OD_T$, control may pass to a block 118 where the cutting tool is repositioned to machine the valve spool stock down to the spool guide region outer diameter $OD_G$. While the cutting tool is repositioned for the next machining operation, the valve spool stock is maintained secure within the chuck and is not repositioned. Maintaining the valve spool stock in the same chucking ensures that the geometric tolerances of both diametrical clearances $C_G$, $C_T$ can be held with respect to other datum of the spool valve assembly 10. After the cutting tool is repositioned at the block 118, control may pass to a block 120 where the machine is operated to machine the first spool guide region 88 and the second spool guide region 90 of the spool outer surface 84 to the spool guide region outer diameter $OD_G$. It is possible that the machining may overlap into the spool intermediate regions 94, 96, but the machining does not extend into the spool tight clearance region 92 where the spool tight clearance outer diameter $OD_T$ is maintained.

After the spool guide regions 88, 90 are machined down to the spool guide region outer diameter $OD_G$, control may pass to a block 122 to machine the other features in the spool outer surface 84, such as the spool intermediate regions 94, 96. The valve spool stock can remain secured in the chuck of the machine if the cutting tool or other cutting tools can cut the spool outer surface 84 at the spool intermediate regions 94, 96. Alternatively, the valve spool stock may be removed from the chuck and repositioned and re-secured in the chuck to perform the additional machining operations. In other manufacturing processes, the valve spool stock may be moved to a different machine that is capable of machining the spool intermediate regions 94, 96 into the spool outer surface 84.

With the machining of the spool outer surface 84 complete, control may pass to a block 124 where the valve spool stock may be transferred to other appropriate machines for machining the spool inner surface 86 to form the internal features of the valve spool 28 such as the balance chambers 34, 36, the spool balance fluid passage 40 and the valve spool stop surface 48. In alternative embodiments, the valve spool stock may be cast using a die that forms the features of the spool inner surface 86 in the valve spool stock, and the step at the block 124 may be omitted. In either case, once the spool outer surface 84 is machined at the blocks 112-122 and the spool inner surface 86 is machined or otherwise formed in the valve spool stock, control may pass to block 126 where the radial passages 42 are machined to extend through the valve spool 28 and place the spool outer surface 84 in fluid communication with the spool inner surface 86.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A valve spool comprising:
    a cylindrical spool body having a spool longitudinal axis, a first spool body end wall and a second spool body end wall disposed axially opposite the first spool body end wall; and
    a spool outer surface comprising
        a first spool guide region proximate the first spool body end wall and having a first spool guide region outer surface,
        a second spool guide region proximate the second spool body end wall and having a second spool guide region outer surface, wherein the first spool guide region outer surface and the second spool guide region outer surface have a maximum spool guide region outer diameter that is equal, and
        a spool tight clearance region disposed between the first spool guide region and the second spool guide region and having a spool tight clearance region outer surface with a maximum spool tight clearance region outer diameter that is greater than the maximum spool guide region outer diameter,
    wherein the valve spool is installed in a spool valve assembly having a valve body with a valve bore having the valve spool disposed therein and having a valve bore inner diameter that is greater than the maximum spool tight clearance region outer diameter, and
    wherein a minimum spool tight clearance region diametrical clearance between the spool tight clearance region of the spool outer surface and the valve bore is determined by a formula as follows:

$$C_{Tmin} = C_{Gmax} * \left[ \frac{L_T}{L_G} + \frac{2 * L_{OFF}}{L_G} \right]$$

where $C_{Tmin}$ is the minimum spool tight clearance region diametrical clearance equal to the valve bore inner diameter minus the maximum spool tight clearance region outer diameter, $C_{Gmax}$ is a maximum spool guide region diametrical clearance equal to the valve bore inner diameter minus the maximum spool guide region outer diameter, $L_G$ is a spool longitudinal guide length from the first spool body end wall to the second spool body end wall, $L_T$ is a spool longitudinal tight clearance region length, and $L_{OFF}$ is an offset length from a spool longitudinal tight clearance region midpoint to a spool longitudinal guide midpoint.

2. The valve spool of claim 1, wherein the spool outer surface comprises:
    a first spool intermediate region disposed between the first spool guide region and the spool tight clearance region and having a first spool intermediate region outer diameter that is less than the maximum spool guide region outer diameter; and
    a second spool intermediate region disposed between the second spool guide region and the spool tight clearance region and having a second spool intermediate region outer diameter that is less than the maximum spool guide region outer diameter.

3. The valve spool of claim 2, wherein the valve body further includes a high pressure fluid supply passage, a high pressure fluid outlet passage and a low pressure fluid drain passage each intersecting the valve bore so that the high pressure fluid outlet passage is in fluid communication with the low pressure fluid drain passage and the high pressure fluid supply passage is not in fluid communication with the high pressure fluid outlet passage when the valve spool is in a first valve spool position within the valve bore, and the high pressure fluid supply passage is in fluid communication with the high pressure fluid outlet passage and the high pressure fluid outlet passage is not in fluid communication with the low pressure fluid drain passage when the valve spool is in a second valve spool position within the valve bore.

4. The valve spool of claim 3, wherein a fluid passage edge is defined at an intersection of the high pressure fluid supply passage and the valve bore, and a spool guide region edge is defined at an intersection of the second spool guide region and the second spool intermediate region, and wherein the spool guide region edge does not move longitudinally past the fluid passage edge when the valve spool moves between the first valve spool position and the second valve spool position.

5. The valve spool of claim 1, comprising a spool inner surface defining a first balance chamber extending inwardly into the valve spool from the first spool body end wall, a second balance chamber extending inwardly into the valve spool from the second spool body end wall, and a spool balance fluid passage extending through the valve spool and placing the first balance chamber in fluid communication with the second balance chamber.

6. A valve spool comprising:
a cylindrical spool body having a spool longitudinal axis, a first spool body end wall and a second spool body end wall disposed axially opposite the first spool body end wall; and
a spool outer surface comprising
a first spool guide region proximate the first spool body end wall and having a first spool guide region outer surface,
a second spool guide region proximate the second spool body end wall and having a second spool guide region outer surface, wherein the first spool guide region outer surface and the second spool guide region outer surface have a maximum spool guide region outer diameter that is equal, and
a spool tight clearance region disposed between the first spool guide region and the second spool guide region and having a maximum spool tight clearance region outer diameter that is greater than the maximum spool guide region outer diameter,
wherein the valve spool is installed in a spool valve assembly having a valve body with a valve bore having the valve spool disposed therein and having a valve bore inner diameter that is greater than the maximum spool tight clearance region outer diameter, and
wherein the first spool guide region, the second spool guide region and the spool tight clearance region are dimensioned so that a first spool edge of the first spool guide region proximate the first spool body end wall and a second spool edge of the second spool guide region proximate the second spool body end wall can contact the valve bore and the spool tight clearance region does not contact the valve bore when the valve spool rotates about an axis that is perpendicular to the spool longitudinal axis.

7. A spool valve assembly comprising:
a valve body having a valve bore extending longitudinally within the valve body and having a valve bore inner diameter, a high pressure fluid supply passage intersecting the valve bore, a high pressure fluid outlet passage intersecting the valve bore and a low pressure fluid drain passage intersecting the valve bore; and
a valve spool disposed within the valve bore and having a cylindrical spool body, a spool longitudinal axis, a spool outer surface, a first spool body end wall and a second spool body end wall disposed axially opposite the first spool body end wall, wherein the spool outer surface comprises
a first spool guide region proximate the first spool body end wall and having a first spool guide region outer surface with a maximum spool guide region outer diameter that is less than the valve bore inner diameter;
a second spool guide region proximate the second spool body end wall and having a second spool guide region outer surface with the maximum spool guide region outer diameter of the first spool guide region outer surface; and
a spool tight clearance region disposed between the first spool guide region and the second spool guide region and having a spool tight clearance region outer surface with a maximum spool tight clearance region outer diameter that is less than the valve bore inner diameter and greater than the maximum spool guide region outer diameter, wherein the high pressure fluid outlet passage is in fluid communication with the low pressure fluid drain passage and the high pressure fluid supply passage is not in fluid communication with the high pressure fluid outlet passage when the valve spool is in a first valve spool position within the valve bore, and the high pressure fluid supply passage is in fluid communication with the high pressure fluid outlet passage and the high pressure fluid outlet passage is not in fluid communication with the low pressure fluid drain passage when the valve spool is in a second valve spool position within the valve bore,
wherein a minimum spool tight clearance region diametrical clearance between the spool tight clearance region of the spool outer surface and the valve bore is determined by a formula as follows:

$$C_{Tmin} = C_{Gmax} * \left[ \frac{L_T}{L_G} + \frac{2*L_{OFF}}{L_G} \right]$$

where $C_{Tmin}$ is the minimum spool tight clearance region diametrical clearance equal to the valve bore inner diameter minus the maximum spool tight clearance region outer diameter, $C_{Gmax}$ is a maximum spool guide region diametrical clearance equal to the valve bore inner diameter minus the maximum spool guide region outer diameter, $L_G$ is a spool longitudinal guide length from the first spool body end wall to the second spool body end wall, $L_T$ is a spool longitudinal tight clearance region length, and $L_{OFF}$ is an offset length from a spool longitudinal tight clearance region midpoint to a spool longitudinal guide midpoint.

8. The spool valve assembly of claim 7, wherein the spool outer surface comprises:
a first spool intermediate region disposed between the first spool guide region and the spool tight clearance region and having a first spool intermediate region outer diameter that is less than the maximum spool guide region outer diameter; and
a second spool intermediate region disposed between the second spool guide region and the spool tight clearance region and having a second spool intermediate region outer diameter that is less than the maximum spool guide region outer diameter.

9. The spool valve assembly of claim 8, wherein a fluid passage edge is defined at an intersection of the high pressure fluid supply passage and the valve bore, and a spool guide region edge is defined at an intersection of the second spool guide region and the second spool intermediate region, and wherein the spool guide region edge does not move longitudinally past the fluid passage edge when the valve spool moves between the first valve spool position and the second valve spool position.

10. The spool valve assembly of claim 7, wherein the valve spool comprises a spool inner surface defining a first balance chamber extending inwardly into the valve spool from the first spool body end wall, a second balance chamber extending inwardly into the valve spool from the second spool body end wall, and a spool balance fluid passage extending through the valve spool and placing the first balance chamber in fluid communication with the second balance chamber.

11. A spool valve assembly comprising:
- a valve body having a valve bore extending longitudinally within the valve body and having a valve bore inner diameter, a high pressure fluid supply passage intersecting the valve bore, a high pressure fluid outlet passage intersecting the valve bore and a low pressure fluid drain passage intersecting the valve bore; and
- a valve spool disposed within the valve bore and having a cylindrical spool body, a spool longitudinal axis, a spool outer surface, a first spool body end wall and a second spool body end wall disposed axially opposite the first spool body end wall, wherein the spool outer surface comprises
  - a first spool guide region proximate the first spool body end wall and having a first spool guide region outer surface with a maximum spool guide region outer diameter that is less than the valve bore inner diameter;
  - a second spool guide region proximate the second spool body end wall and having a second spool guide region outer surface with the maximum spool guide region outer diameter of the first spool guide region outer surface; and
  - a spool tight clearance region disposed between the first spool guide region and the second spool guide region and having a spool tight clearance region outer surface with a maximum spool tight clearance region outer diameter that is less than the valve bore inner diameter and greater than the maximum spool guide region outer diameter, wherein the high pressure fluid outlet passage is in fluid communication with the low pressure fluid drain passage and the high pressure fluid supply passage is not in fluid communication with the high pressure fluid outlet passage when the valve spool is in a first valve spool position within the valve bore, and the high pressure fluid supply passage is in fluid communication with the high pressure fluid outlet passage and the high pressure fluid outlet passage is not in fluid communication with the low pressure fluid drain passage when the valve spool is in a second valve spool position within the valve bore, wherein the first spool guide region, the second spool guide region and the spool tight clearance region are dimensioned so that a first spool edge of the first spool guide region proximate the first spool body end wall and a second spool edge of the second spool guide region proximate the second spool body end wall can contact the valve bore and the spool tight clearance region does not contact the valve bore when the valve spool rotates about an axis that is perpendicular to the spool longitudinal axis.

* * * * *